United States Patent
Becka

(10) Patent No.: US 9,951,859 B2
(45) Date of Patent: Apr. 24, 2018

(54) GEARSET WITH AN AIR-GUIDING COVER

(71) Applicant: SIEMENS AKTIENGESELLSCHAFT, München (DE)

(72) Inventor: Simon Becka, Essen (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 15/136,288

(22) Filed: Apr. 22, 2016

(65) Prior Publication Data

US 2016/0312877 A1    Oct. 27, 2016

(30) Foreign Application Priority Data

Apr. 23, 2015 (EP) .................................... 15164779

(51) Int. Cl.
| | |
|---|---|
| *F16H 57/04* | (2010.01) |
| *F16H 57/031* | (2012.01) |
| *F16H 57/02* | (2012.01) |

(52) U.S. Cl.
CPC ....... *F16H 57/0416* (2013.01); *F16H 57/031* (2013.01); *F16H 2057/02069* (2013.01)

(58) Field of Classification Search
CPC ............... F16H 57/031; F16H 57/0412; F16H 57/0415; F16H 57/0416; F16H 2057/02069

See application file for complete search history.

(56) References Cited

U.S. PATENT DOCUMENTS

| | | | | |
|---|---|---|---|---|
| 2,756,614 A | * | 7/1956 | Kobayashi | F16H 1/145 74/425 |
| 4,414,861 A | * | 11/1983 | Witt | F16H 57/0427 184/13.1 |
| 4,872,502 A | * | 10/1989 | Holzman | F16H 57/0415 165/119 |
| 5,801,362 A | * | 9/1998 | Pearlman | A47J 37/0623 126/21 A |
| 8,556,585 B2 | * | 10/2013 | Abe | F16H 57/0416 415/77 |
| 9,366,332 B2 | * | 6/2016 | Hayashi | F16H 57/0416 |
| 9,599,406 B2 | * | 3/2017 | Tietyen | F28D 1/024 |
| 2007/0264122 A1 | * | 11/2007 | Iwasaki | F04D 25/166 416/120 |
| 2010/0095804 A1 | * | 4/2010 | Gilbert | F16H 57/02 74/606 A |

(Continued)

FOREIGN PATENT DOCUMENTS

| | | |
|---|---|---|
| CN | 103486238 A | 1/2014 |
| CN | 104343944 A | 2/2015 |

(Continued)

*Primary Examiner* — Adam D Rogers
(74) *Attorney, Agent, or Firm* — Henry M. Feiereisen, LLC

(57) ABSTRACT

A gearset includes a gearset housing, a drive shaft, and a radial fan fixed to the drive shaft. Disposed in surrounding relationship to the radial fan is an air-guiding cover which includes a gearset housing section to at least partially cover the gearset housing, a cylindrical section adjoining the gearset housing section and configured to receive an attachment for securement to the drive shaft, and a conical section adjoining the cylindrical section. The conical section of the air-guiding cover is disposed in surrounding relationship to the radial fan directly and without any dead space.

11 Claims, 4 Drawing Sheets

(56) References Cited

U.S. PATENT DOCUMENTS

2015/0192197 A1* 7/2015 Volker ................ F16H 57/0416
                                                        415/121.3
2015/0296658 A1* 10/2015 Kimura ............... F16H 57/0416
                                                        361/697
2016/0290478 A1* 10/2016 Kimura ................ F04D 29/547

FOREIGN PATENT DOCUMENTS

| DE | 1984404 U | 4/1968 | |
|---|---|---|---|
| DE | 102005031197 A1 * | 1/2007 | ........... F04D 29/329 |
| DE | 102008010912 A1 | 8/2008 | |
| DE | 102012000682 A1 | 7/2013 | |
| DE | 102012013351 A1 | 5/2014 | |
| EP | 2020536 B1 | 8/2011 | |
| EP | 2410210 A1 | 1/2012 | |
| GB | 1094709 A * | 12/1967 | ........ F16H 57/0412 |
| WO | WO 2009124687 A1 * | 10/2009 | ........... F16H 57/031 |
| WO | WO 2014155452 A1 * | 10/2014 | ........ F16H 57/0416 |

* cited by examiner

GEARSET WITH AN AIR-GUIDING COVER

CROSS-REFERENCES TO RELATED APPLICATIONS

This application claims the priority of European Patent Application, Serial No. 15164779.9, filed Apr. 23, 2015, pursuant to 35 U.S.C. 119(a)-(d), the disclosure of which is incorporated herein by reference in its entirety as if fully set forth herein.

BACKGROUND OF THE INVENTION

The present invention relates to a gearset having an air-guiding cover for conducting an air flow.

The following discussion of related art is provided to assist the reader in understanding the advantages of the invention, and is not to be construed as an admission that this related art is prior art to this invention.

Gearsets become very hot due to the power loss that occurs during operation. An oil temperature that is established in the gearset limits the admissible mechanical power of the respective gearset. External oil cooling systems are often undesirable, so cooling has to take place by way of air (ambient air) surrounding the gearset.

For this purpose, air-guiding covers for gearsets are generally used to route an air flow generated by a radial or axial fan purposefully around the housing of the respective gearset. Air-guiding covers are conventionally designed such that at a ventilator side (suction side) they have an opening for drawing in ambient air by means of a fan received by the air-guiding cover. Connected to such a suction-side section of the air-guiding cover is a corner part enclosing the gearset housing.

US 2015/0192197 describes a radial fan having two cover plates. The radial fan is surrounded by an air-guiding cover which allows pure radial suction intake of the ambient air by means of a partition plate. One end of the air-guiding cover is designed in the manner of a nozzle in order to conduct the drawn-in ambient air to the gearset housing. The use of a radial fan in an air-guiding cover necessitates a deflection of the radial air flow of the fan. In the event, the gearset includes cylindrical attachments, for example an attachment in the form of a non-return device, which are mounted on the drive shaft, there is a problem that cooling of the gearset by ambient air requires a bridging of an attachment of this kind, or a plurality of attachments.

It would therefore be desirable and advantageous to provide an improved gearset which obviates prior art shortcomings and which can be efficiently cooled via a radial fan while still enabling to bridge and effectively cool any attachments.

SUMMARY OF THE INVENTION

According to one aspect of the present invention, a gearset includes a gearset housing, a drive shaft (gear shaft), a radial fan fixed to the drive shaft, and an air-guiding cover disposed in surrounding relationship to the radial fan and including a gearset housing section to at least partially cover the gearset housing, a cylindrical section adjoining the gearset housing section and configured to receive an attachment for securement to the drive shaft, and a conical section adjoining the cylindrical section, the conical section disposed in surrounding relationship to the radial fan directly and without any dead space.

In an air-guiding cover that is fixed to the gearset housing, the cylindrical section and the adjoining conical section are located upstream of the gearset housing and in the region of the drive shaft protruding from the gearset housing. The conical section of the air-guiding cover surrounds the radial fan directly and without any dead space. The reference to "conical" is hereby intended to make it clear that the circumferential surface of the conical section corresponds to a mathematical surface of a cone. The conical section is effective in deflecting the air flow conveyed by the radial fan in the radial direction in a direction parallel, or at least substantially parallel, to the drive shaft. The cylindrical section of the air-guiding cover is intended to receive at least one attachment of the gearset which attachment is fixed to, or can be fixed to, the drive shaft.

The position information "upstream of the gearset housing" refers to the air flow that results during operation of the gearset. The radial fan is accordingly located in the flow direction upstream of the gearset and its gearset housing. Consequently the conical section of the air-guiding cover surrounding the radial fan is located upstream of the gearset housing section of the air-guiding cover that partially surrounds the gearset housing.

An advantage of the present invention resides in the fact that the conical section of the air-guiding cover is simultaneously effective in enclosing the radial fan and in deflecting an air flow generated by the radial fan in the direction of the gearset housing. Compared to axial fans, more cost-effective radial fans, which are independent of direction of rotation, can thus be used for realizing an efficient cooling of a gearset. There is no need for additional parts to effect air deflection. Since the conical section surrounds the radial fan directly, it is ensured that the air flow conveyed by the radial fan strikes the inside surface of the conical section of the air-guiding cover directly, without obstruction and turbulence as a result of, for example, components or construction elements located in the radial direction between the ends of the fan blades and the inside surface of the conical section. Thus, the conical section is thus able to effectively deflect the air flow. Since the conical section surrounds the radial fan without any dead space, it is ensured that the initially radially accelerated volume flow continues as an axial volume flow following the conical section without encountering flow losses as a result of turbulence or the like, as this would be expected in the case of a geometry that also causes a defection but does not surround the fan without any dead space. This enclosure of the radial fan without any dead space ensures that the air flow conveyed by the radial fan is optimally conducted onward and thus available in its entirety, or at least substantially in its entirety, for cooling of the gearset, i.e. cooling of the gearset by cooling the gearset housing.

According to another advantageous feature of the present invention, the conical section can have an opening angle which can basically be freely chosen depending on the application. Opening angles in the range of 40° to 50°, in particular 45°, are currently preferred. Greater opening angles cause increased pressure and a reduced volume flow. An appropriate opening angle can accordingly be chosen depending on the desired pressure/volume flow. This results in different air-guiding covers adapted to specific cooling requirements.

A further advantage of the present invention resides in the fact that the cylindrical section of the air-guiding cover adjoining the conical section (in the flow direction) is effective in channeling the air flow in the direction of the gearset housing. Advantageously, the cylindrical section defines a longitudinal axis which can run parallel to the drive shaft of the gearset. Advantageously, the longitudinal axis coincides with a longitudinal axis of the drive shaft. This channeling has two effects: firstly, the air flow is guided in the direction of the gearset housing. Secondly, the air flow is guided past one or more attachment(s) of the gearset, optionally located in the region of the cylindrical section.

In this way, ambient air drawn in by the radial fan can flow around and thereby cool attachments of the gearset, for example a non-return device, one or more planetary gear stage(s), a brake, a measuring element or a plurality of measuring elements fixed in the region of the cylindrical section. The length of the cylindrical section can be adapted to a respective number and/or dimension of the or each attachment as required. Following the cylindrical section of the air-guiding cover, the ambient air drawn in by the radial fan can strike the gearset housing (impingement cooling) and can cause intense cooling of the gearset housing, as a result of the impingement cooling, to thereby cool the gearset and, in the further course of the air flow through the gap remaining between air-guiding cover and gearset housing, to further cool the gearset.

According to another advantageous feature of the present invention, ambient air drawn in by the radial fan can be deflected by the conical section and flows through the cylindrical section to subsequently effectively cool the gearset housing by impingement cooling. The diameter of the cylindrical section is hereby dimensioned and the cylindrical section is positioned inside the air-guiding cover and in respect of the gearset housing such that an imaginary circular area resulting due to the cylindrical section and projected in the axial direction of the cylindrical section falls completely, or at least substantially, on a side surface (front surface) of the gearset housing. The side surface of the gearset housing against which air flows, will hereinafter be referred to as front surface of the gearset housing, as the drive shaft exits there. Since the cylindrical section of the air-guiding cover is oriented in respect to the front surface such that the surface normal of the front surface runs parallel, or at least substantially parallel, to the longitudinal axis of the cylindrical section, air which is drawn in by the radial fan can be deflected by the radial section of the air-guiding cover and channeled by the cylindrical section of the air-guiding cover to strike the front surface of the gearset housing perpendicularly or substantially perpendicularly and thereby realize an optimum cooling of the surface of the gearset housing.

According to another advantageous feature of the present invention, the radial fan can have a fan hub provided with a bevel or a radius, with the radial fan being fixed to the drive shaft by the fan hub. The conical section of the air-guiding cover enclosing the radial fan causes the above-described deflection of the radial air flow generated by the radial fan in the direction of the gearset housing. With a radial fan having a fan hub, which is provided with a bevel or a radius, a geometry of this kind assists a first deflection of the drawn-in air in the radial direction and avoids flow loss in the region of the fan hub.

According to another advantageous feature of the present invention, it is provided that at least one attachment or a plurality of attachments, for example further gearset components, a non-return device, one or more planetary gear stage(s), one or more brake(s), one or more measuring element(s), etc., is or are fixed to the drive shaft and between the radial fan and the gearset and that the cylindrical section surrounds the or each attachment. This ensures that ambient air deflected by the conical section in the direction of the gearset/gearset housing and drawn in by the radial fan also causes cooling of the attachment(s) fixed in the region of the cylindrical section of the air-guiding cover.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
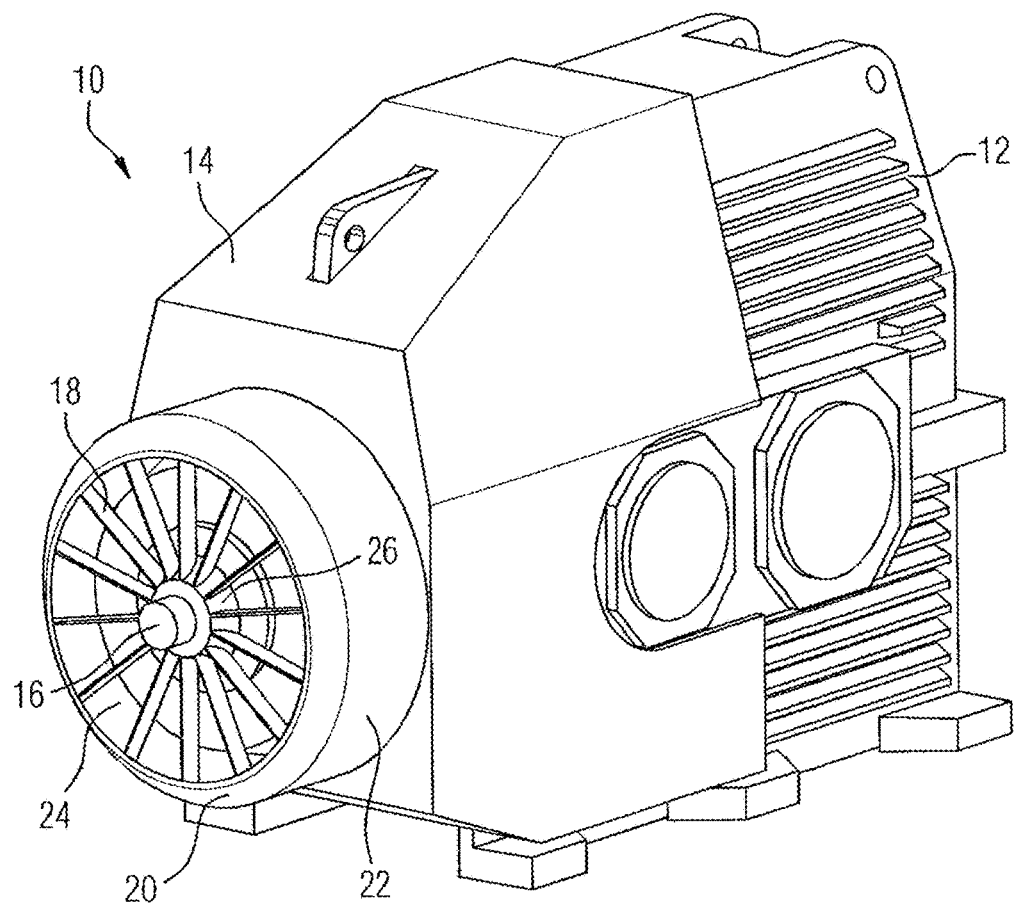
FIG. 1 is a top and side perspective illustration of a gearset having a gearset housing and an air-guiding cover fixed to the gearset housing.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top and side perspective illustration of a gearset having an air-guiding cover 10 in accordance with the present invention. The air-guiding cover 10 is shown in a state fixed to a housing (gearset housing 12) of the gearset. Part of the air-guiding cover 10 covers part of the gearset housing 12. This part of the air-guiding cover 10 is designated hereinafter as "gearset housing section 14" of the air-guiding cover 10.

Opposite the gearset housing section 14, the air-guiding cover 10 receives a radial fan 18 fixed to a drive shaft 16 of the gearset and has for this purpose a conical section 20 that surrounds the radial fan 18 directly and without any dead space. Following this conical section 20 and further in the direction of the gearset housing section 14, the air-guiding cover 10 has a cylindrical section 22. The gearset housing section 14 adjoins the cylindrical section 22 with a front surface which is oriented perpendicularly to the longitudinal axis of the cylindrical section 22, and which encloses an opening corresponding to the diameter of the cylindrical section 22. Starting from this front surface, the gearset housing section 14 extends with a polyhedral shape around part of the gearset housing 12 and is adapted with its polyhedral shape to the likewise polyhedral shape of the gearset housing 12 such that single surfaces of the gearset housing section 14 are oriented parallel, or at least substantially parallel, to respectively covered surface sections of the gearset housing 12.

The radial fan 18 draws ambient air in through an opening 24 delimited by an edge of the conical section 20 and conveys it inside the air-guiding cover 10 to the outside onto the inner surface of the conical section 20. The conical section 20 brings about a deflection of the radial air flow in the direction of the gearset housing 12. A fan hub 26 provided with a radius or a bevel optionally assists this deflection of the air flow. On its way to the gearset housing 12, the deflected air flow flows through the cylindrical section 22 and is effective there in cooling attachments optionally mounted upstream of the gearset and on the drive shaft 16, such as, for example, a planetary gear stage or a non-return device 28 (FIG. 2) or other gearset components.

The cylindrical section 22 is used for channeling the drawn-in ambient air in the direction of the gearset housing 12 and bridging and cooling usually cylindrical attachments that are optionally also fixed there. At the end of the cylindrical section 22, the channeled air strikes the gearset housing 12. The impact of the air flow (impingement cooling) on the gearset housing 12, in particular a perpendicular impact on a front surface 30 of the gearset housing 12, locally achieves intense cooling of the gearset housing 12 and of the gearset surrounded by it. The air is then conveyed further around the gearset housing 12 by the air-guiding cover 10.

Advantageously, the air-guiding cover 10 and radial fan 18 are designed such that a total width of the gearset housing 12 is not exceeded. The conical section 20 and adjoining cylindrical section 22 of the air-guiding cover 10 are advantageously dimensioned such that the diameter of the cylindrical section 22 does not exceed a width, or width and a height, of a front surface 30 of the gearset housing 12. The volume flow and the pressure applied by the radial fan 18 can be influenced by different numbers of radial fan blades, a variation in the width of the radial fan 18, a variation of the angle of the bevel of the ends of the radial fan blades and/or a variation in the opening angle α of the conical section 20.

Figure 2:
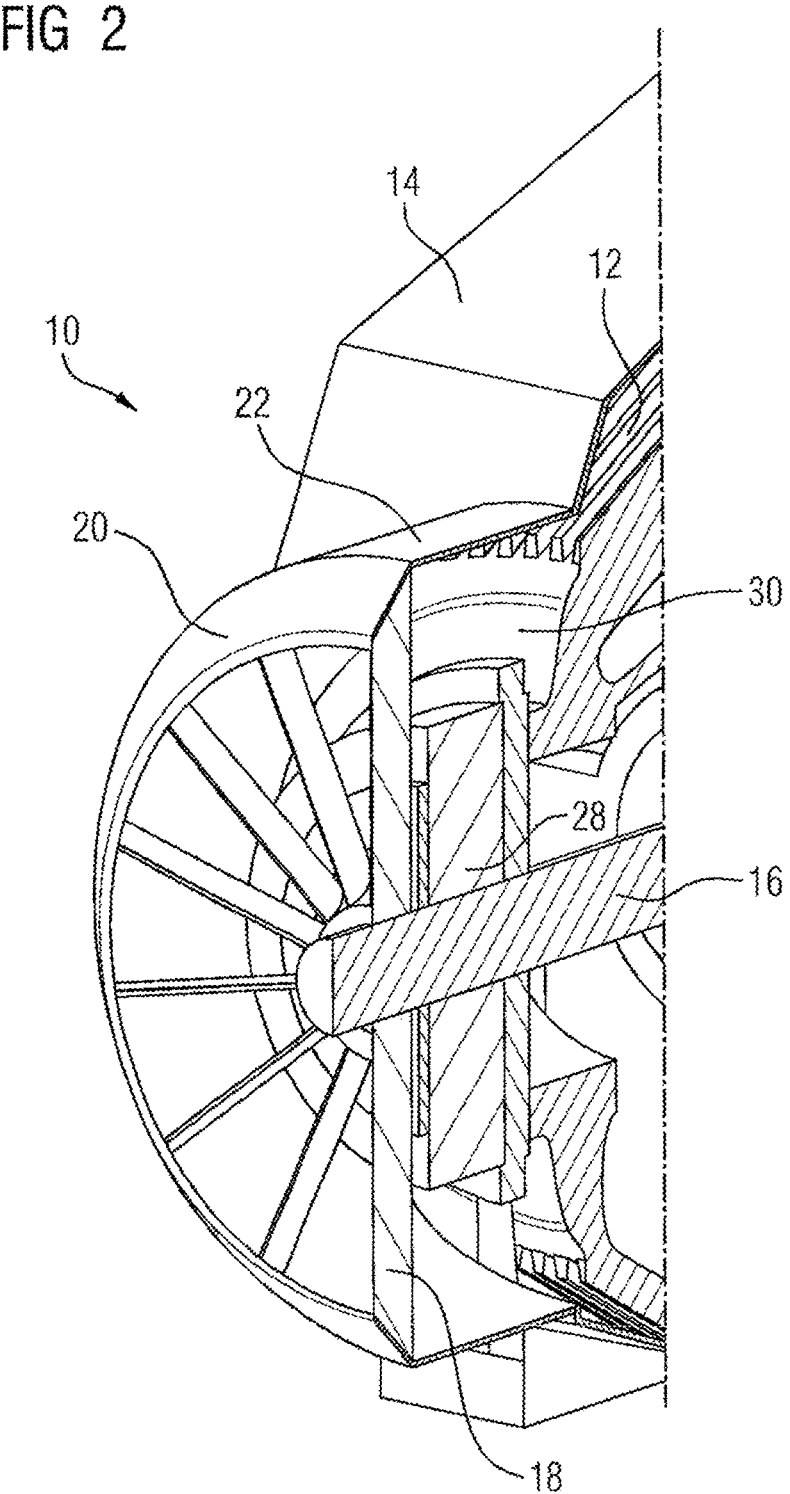
FIG. 2 is a longitudinal section, on an enlarged scale, of a detail of the gearset housing of FIG. 1.

FIG. 2 is a longitudinal section, on an enlarged scale, of a detail of the gearset housing of FIG. 1. A non-return device 28 is specifically disposed in the region of the cylindrical section 22 as an example of an attachment that can be placed in the region of the cylindrical section 22. FIG. 2 further shows the front surface 30 of the gearset housing 12, against which air flows during operation.

Figure 3:
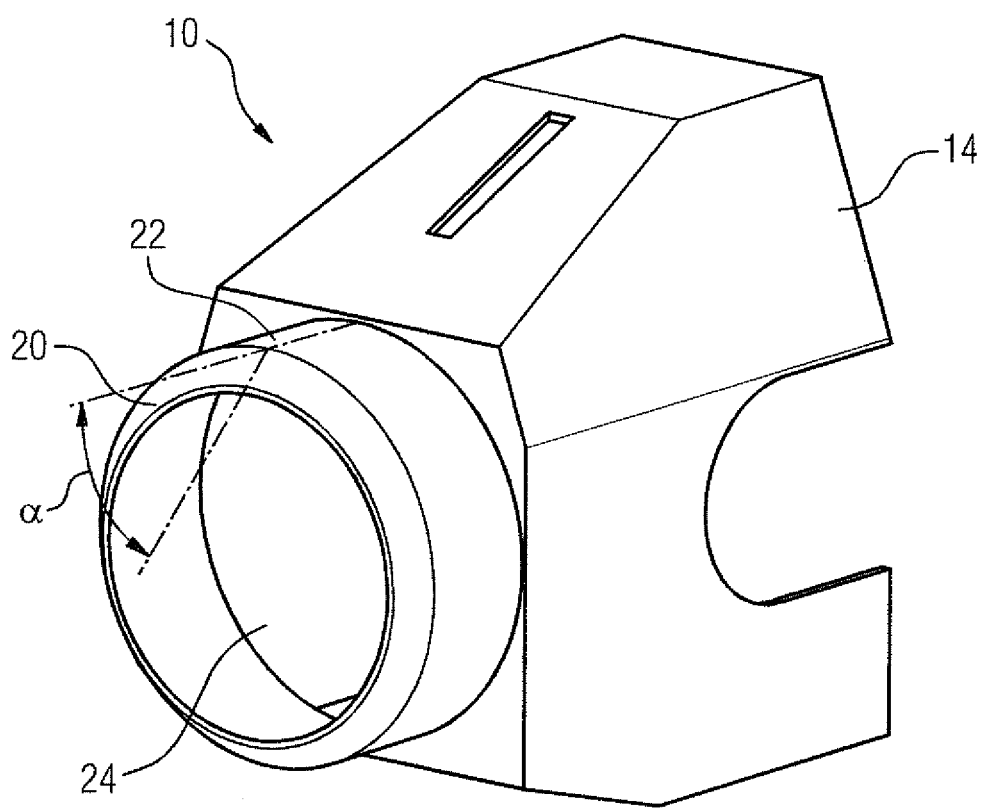
FIG. 3 is a top and side perspective illustration of the air-guiding cover of FIG. 1.

The illustration in FIG. 3 shows the air-guiding cover 10 of the embodiment shown in FIG. 1 without the gearset housing 12 and without a radial fan 18. Upstream of the gearset housing section 14 of the air-guiding cover 10, the cylindrical section 22, the conical section 20 adjoining the cylindrical section 22, the conical section 20 having an opening angle α in a range of 40° to 50°, and the opening 24 delimited by the edge of the conical section 20, of the air-guiding cover 10 can clearly be seen. During operation, a radial fan 18 fixed to a drive shaft 16 of a gearset provided with the air-guiding cover 10 draws in ambient air through the opening 24 in order to cool the gearset by way of heat dissipation from its gearset housing 12 and to cool attachments optionally located in the region of the cylindrical section 22.

Figure 4:
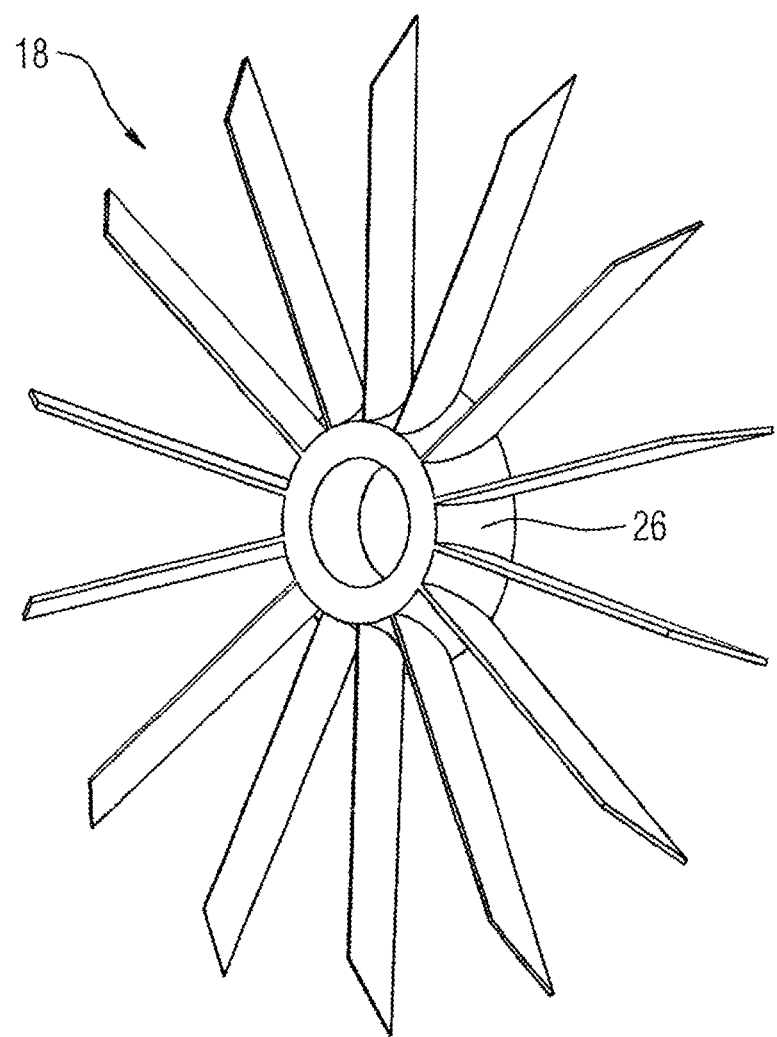
FIG. 4 is an enlarged detailed view of a radial fan.

FIG. 4 shows a possible embodiment of a radial fan 18 having plurality of regularly spaced-apart radial fan blades. The radial fan 18 has a fan hub 26 provided with a bevel. In addition to the conical section 20 of the air-guiding cover 10, this is effective in deflecting the drawn-in air in the direction of the gearset housing 12. In the illustrated embodiment, the radial fan blades are beveled at the same angle as the conical section 20, so as to realize a maximum possible length of the radial fan blades and thus a greatest possible air performance of the radial fan 18.

Individual aspects of the description presented here may be briefly summarized as follows: a gearset having a gearset housing 12, a drive shaft 16, a radial fan 18 fixed to the drive shaft 16 and an air-guiding cover 10 surrounding the radial fan 18 is disclosed, wherein the air-guiding cover 10 comprises a gearset housing section 14 with which it at least partly covers the gearset housing 12, and a cylindrical section 22 adjoining the gearset housing section 14 and a conical section 20 in turn adjoining the cylindrical section, wherein the conical section 20 surrounds the radial fan 18 directly and without any dead space and wherein the cylindrical section 22 is intended to receive an attachment that can be fixed to the drive shaft 16. The invention is, however, also an air-guiding cover 10 intended for fixing to a gearset of this kind, namely an air-guiding cover 10 for a gearset and for fixing to its gearset housing 12, wherein the air-guiding cover 10 has a gearset housing section 14 at least partially covering the gearset housing 12 and in the region of a drive shaft 16 has a cylindrical section 22 and a conical section 20, wherein the conical section 20 is intended to receive and to enclose directly and without any dead space a radial fan 18 fixed to the drive shaft 16 and the cylindrical section 22 is intended to receive an attachment fixed to the drive shaft 16.

While the invention has been illustrated and described in connection with currently preferred embodiments shown and described in detail, it is not intended to be limited to the details shown since various modifications and structural changes may be made without departing in any from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A gearset, comprising:
   a gearset housing;
   a drive shaft;
   a radial fan having blades, said radial fan being fixed to the drive shaft; and
   an air-guiding cover disposed in a surrounding relationship to the radial fan and including a gearset housing section to at least partially cover the gearset housing, said gearset housing section extending along an entire circumference of the air guiding cover, a cylindrical section adjoining the gearset housing section and configured to receive an attachment for securement to the drive shaft, and a conical section adjoining the cylindrical section, said conical section surrounding the radial fan, wherein ends of the blades of the radial fan are beveled at a same angle as an opening angle of the conical section of the air-guiding cover.

2. The gearset of claim 1, wherein the cylindrical section defines a longitudinal axis which runs parallel to the drive shaft.

3. The gearset of claim 2, wherein the longitudinal axis coincides with a longitudinal axis of the drive shaft.

4. The gearset of claim 1, wherein ambient air drawn in by the radial fan is deflected by the conical section and flows through the cylindrical section to subsequently cool the gearset housing by impingement cooling.

5. The gearset of claim 4, wherein ambient air deflected by the conical section is guided by the cylindrical section substantially perpendicularly onto a side surface of the gearset housing.

6. The gearset of claim 1, wherein the opening angle of the conical section is 45°.

7. The gearset of claim 1, wherein the radial fan has a fan hub provided with a bevel or a radius, said radial fan being fixed to the drive shaft by the fan hub.

8. The gearset of claim 1, wherein the cylindrical section is placed in surrounding relationship to the attachment.

9. The gearset of claim 1, wherein the gearset housing section has a polyhedral configuration.

10. The gearset of claim 9, wherein the polyhedral gearset housing section of the air-guiding cover is configured to surround a polyhedral part of the gearset housing such that single surfaces of the gearset housing section are oriented substantially parallel to covered surface sections of the gearset housing.

11. A gearset, comprising:
a gearset housing;
a drive shaft;
a radial fan having blades, said radial fan being fixed to the drive shaft; and
an air-guiding cover disposed in a surrounding relationship to the radial fan and including a gearset housing section to at least partially cover the gearset housing, said gearset housing section extending along an entire circumference of the air guiding cover, a cylindrical section adjoining the gearset housing section and configured to receive an attachment for securement to the drive shaft, and a conical section having an opening angle in a range of 40° to 50°, and adjoining the cylindrical section, said conical section surrounding the radial fan, wherein ends of the blades of the radial fan are beveled at a same angle as the opening angle of the conical section of the air-guiding cover.

* * * * *